(12) United States Patent
Soma et al.

(10) Patent No.: US 7,663,343 B2
(45) Date of Patent: Feb. 16, 2010

(54) CONTROLLER FOR DRIVE SYSTEM

(75) Inventors: Takaya Soma, Toyota (JP); Hiroshi Yoshida, Anjo (JP); Takeshi Mogari, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 813 days.

(21) Appl. No.: 11/449,728

(22) Filed: Jun. 9, 2006

(65) Prior Publication Data
US 2007/0001650 A1 Jan. 4, 2007

(30) Foreign Application Priority Data
Jun. 29, 2005 (JP) .............................. 2005-189358

(51) Int. Cl.
*H02J 7/00* (2006.01)
*B60K 6/20* (2007.10)

(52) U.S. Cl. ..................... 320/134; 320/135; 320/136; 320/166; 903/903; 903/907; 180/65.1; 180/65.21

(58) Field of Classification Search ................... 320/134
See application file for complete search history.

(56) References Cited

U.S. PATENT DOCUMENTS

| | | | |
|---|---|---|---|
| 6,768,027 B2 * | 7/2004 | Takeda | 568/425 |
| 6,975,080 B2 * | 12/2005 | Kitamura et al. | 318/109 |
| 2004/0195016 A1 * | 10/2004 | Shimizu et al. | 180/65.1 |

FOREIGN PATENT DOCUMENTS

| | | |
|---|---|---|
| JP | A 11-332012 | 11/1999 |
| JP | A 2002-35605 | 11/2002 |
| JP | A 2002-335605 | 11/2002 |

* cited by examiner

*Primary Examiner*—Edward Tso
*Assistant Examiner*—Johali A. Torres Ruiz
(74) *Attorney, Agent, or Firm*—Oliff & Berridge

(57) ABSTRACT

If a voltage of each of a plurality of capacitor cells forming a capacitor is lower than a system malfunction voltage V(1), and if the voltage of any one of the capacitor cells is higher than a cell charge inhibition voltage V(2) lower than the system malfunction voltage V(1), an ECU executes a program including a step of setting a limit value WIN(C) of electric power to be stored in the capacitor to be "0".

8 Claims, 5 Drawing Sheets

CONTROLLER FOR DRIVE SYSTEM

This nonprovisional application is based on Japanese Patent Application No. 2005-189358 filed with the Japan Patent Office on Jun. 29, 2005, the entire contents of which are hereby incorporated by reference.

BACKGROUND OF THE INVENTION

1. Field of the Invention

The present invention relates to a controller for a drive system, and in particular to a technique of charging a battery and a capacitor connected in parallel with the battery with electric power generated during regenerative braking of a vehicle.

2. Description of the Background Art

In recent years, as part of measures to address environmental problems, a hybrid vehicle that runs by driving force obtained from at least one of an engine and a motor has received attention. A battery, a capacitor (condenser) and the like are mounted on such a hybrid vehicle for storing electric power to be supplied to the motor.

Japanese Patent Laying-Open No. 11-332012 discloses a vehicle drive system having an engine and an assist motor. The vehicle drive system described in Japanese Patent Laying-Open No. 11-332012 includes an engine generating main propulsion for the vehicle, an assist motor generating propulsion for assisting the vehicle, a starter motor driven by electric power supplied from an auxiliary power storage portion (auxiliary battery) to start the engine, an electric power converter boosting the voltage of the electric power supplied from the auxiliary power storage portion to be a voltage required for the assist motor, a power storage portion (capacitor) for the motor, the power storage portion temporarily storing the electric power whose voltage is boosted by the electric power converter and supplying the stored electric power to the assist motor, and a supplemental charge control portion controlling and regeneratively driving the electric power converter, and using the electric power stored in the power storage portion for the motor to supplementally charge the auxiliary power storage portion. The starter motor is driven by the electric power supplementally stored in the auxiliary power storage portion to start the engine.

According to the vehicle drive system described in the document, electric energy left in the power storage portion for the motor at the last time when the drive system went down is used for starting the engine. By regeneratively driving the electric power converter, the electric power left in the power storage portion for the motor is used to supplementally charge the auxiliary power storage portion. An amount of electric power stored in the auxiliary power storage portion is thereby increased, which allows the auxiliary power storage portion to supply sufficient electric power to the starter motor so that startability of the engine can be improved.

In the vehicle drive system described in Japanese Patent Laying-Open No. 11-332012, electric power is stored in the power storage portion (capacitor) for the motor. At this time, a voltage of the capacitor is generally controlled such that the voltage does not exceed a voltage which is such that the system is considered to be malfunctional when the voltage is reached (e.g. rated voltage). However, even if the voltage of the capacitor is transiently increased because of an operational delay of a charge control (charge control device) and the like, the system is considered to be malfunctional, which may prohibit the vehicle from running.

SUMMARY OF THE INVENTION

The object of the present invention is to provide a controller for a drive system, the controller allowing a capacitor to be charged while malfunction of the drive system is prevented.

A controller for a drive system according to the present invention controls the drive system including a battery, a capacitor connected in parallel with the battery, and a rotating electrical machine generating electric power to be stored in the battery and the capacitor during regenerative braking of a vehicle. The controller includes: a first calculation portion calculating a first maximum value of electric power to be stored in the battery; a second calculation portion calculating a second maximum value of electric power to be stored in the capacitor such that a voltage of the capacitor is not more than a second voltage lower than a predetermined first voltage; a third calculation portion calculating electric power to be generated in the rotating electrical machine based on the first maximum value and the second maximum value; and a control portion controlling charge of the battery and the capacitor based on the first maximum value and the second maximum value.

According to the present invention, the first maximum value of electric power to be stored in the battery is calculated, and the second maximum value of electric power to be stored in the capacitor is calculated such that the voltage of the capacitor is not more than the second voltage lower than the predetermined first voltage. For example, the second maximum value of electric power to be stored in the capacitor is calculated such that the voltage of the capacitor is not more than the second voltage lower than a voltage which is such that the drive system is determined to be malfunctional when the voltage is reached. Electric power to be generated in the rotating electrical machine is calculated based on the first maximum value and the second maximum value, and only the calculated amount of electric power is generated. The generated electric power is stored in the battery and the capacitor based on the first maximum value and the second maximum value. In other words, the battery and the capacitor are charged such that the first maximum value and the second maximum value are not exceeded. Here, the second maximum value is calculated such that the voltage of the capacitor is not more than the second voltage. Therefore, even if the voltage of the capacitor transiently exceeds the second voltage because of an operational delay of a charge control of the capacitor and the like, it is possible to prevent the voltage of the capacitor from exceeding the first voltage which is such that the drive system is determined to be malfunctional when the first voltage is reached. As a result, it is possible to provide the controller for the drive system, the controller allowing the capacitor to be charged while malfunction of the drive system is prevented.

Preferably, the first voltage is such that the drive system is determined to be malfunctional when the voltage of the capacitor reaches the first voltage.

According to the present invention, the second maximum value of electric power to be stored in the capacitor is calculated such that the voltage of the capacitor is not more than the second voltage lower than the voltage which is such that the drive system is determined to be malfunctional when the voltage is reached. Charge of the capacitor is controlled such that such a second maximum value is not exceeded. Accordingly, even if the voltage of the capacitor transiently exceeds the second voltage because of an operational delay of a charge control of the capacitor and the like, it is possible to prevent the voltage of the capacitor from exceeding the first voltage which is such that the drive system is determined to be malfunctional when the first voltage is reached. It is therefore possible to charge the capacitor while preventing malfunction of the drive system.

More preferably, the second calculation portion calculates the second maximum value to be zero when the voltage of the capacitor reaches the second voltage. The capacitor is allowed to be discharged when the voltage of the capacitor reaches the second voltage.

According to the present invention, the second maximum value is calculated to be zero when the voltage of the capacitor reaches the second voltage. In other words, the capacitor stops being charged. Even if the capacitor stops being charged, the capacitor is allowed to be discharged. It is thereby possible to promote lowering of the voltage of the capacitor to a voltage lower than the second voltage. Therefore, even if the voltage of the capacitor transiently exceeds the second voltage because of an operational delay of a charge control of the capacitor and the like, it is possible to prevent the voltage of the capacitor from exceeding the first voltage which is such that the drive system is determined to be malfunctional when the first voltage is reached. As a result, it is possible to charge the capacitor while preventing malfunction of the drive system.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
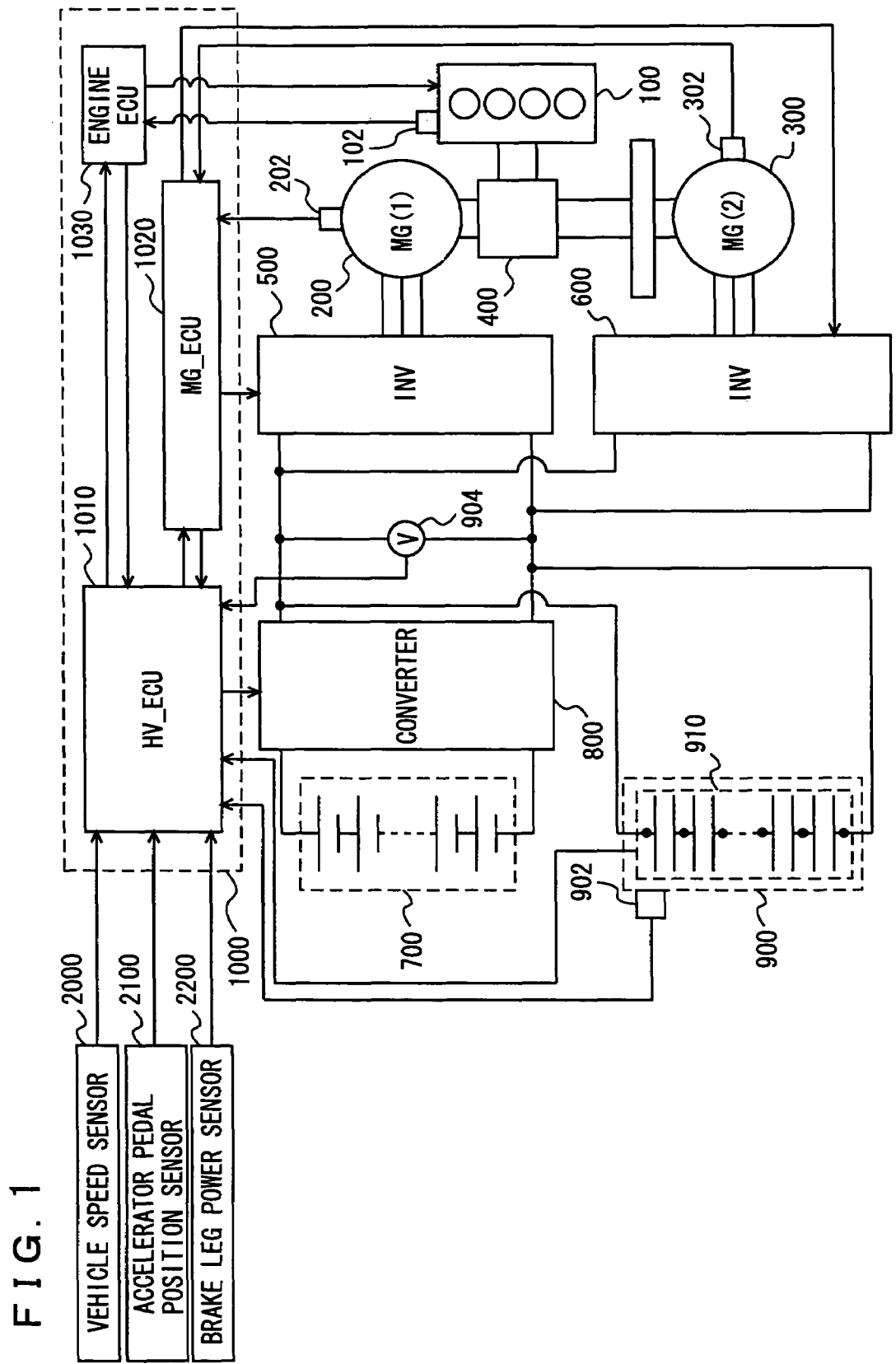
FIG. 1 is a schematic configuration diagram showing a hybrid vehicle on which a controller according to an embodiment of the present invention is mounted.

The embodiment of the present invention will hereinafter be described in detail with reference to the drawings. In the following description, the same parts are denoted by the same reference characters, and have the same names and functions. Therefore the detailed description thereof will not be repeated.

Referring to FIG. 1, there will be described a hybrid vehicle having a controller according to the present embodiment mounted thereon. The vehicle includes an engine 100, a Motor Generator (MG) (1) 200, an MG (2) 300, a power split device 400, an inverter (1) 500, an inverter (2) 600, a battery 700, a converter 800, and a capacitor 900. The vehicle runs by driving force obtained from at least one of engine 100 and MG (2) 300.

Engine 100, MG (1) 200, and MG (2) 300 are connected via power split device 400. Motive power generated by engine 100 is divided by power split device 400 into two paths. One of the paths is a path for driving wheels (not shown) through a reduction gear, while the other is a path for driving MG (1) 200 to generate electric power.

MG (1) 200 is a three-phase alternating motor. MG (1) 200 generates electric power by the motive power generated by engine 100 and divided by power split device 400. The electric power generated by MG (1) 200 is used in various manners depending on a running state of the vehicle and a State Of Charge (SOC) of battery 700. For example, during normal running, the electric power generated by MG (1) 200 is simply used as electric power for driving MG (2) 300. In contrast, if the SOC of battery 700 is below a predetermined value, the electric power generated by MG (1) 200 is converted by inverter 500 from alternating current to direct current, and then stored in battery 700 with its voltage regulated by converter 800, and is stored in capacitor 900 with its voltage unregulated.

When MG (1) 200 acts as a power generator, MG (1) 200 produces negative torque. The negative torque represents torque that serves as a load of engine 100. In contrast, when MG (1) 200 receives electric power to act as a motor, MG (1) 200 produces positive torque. The positive torque represents torque that does not serve as a load of engine 100, namely, torque that assists engine 100 to rotate. The same applies to MG (2) 300.

MG (2) 300 is a three-phase alternating motor. MG (2) 300 is driven by at least any of the electric power stored in battery 700, the electric power stored in capacitor 900, and the electric power generated by MG (1) 200. Electric power converted by inverter (2) 600 from direct current to alternating current is supplied to MG (2) 300.

Driving force of MG (2) 300 is transmitted to the wheels through the reduction gear. MG (2) 300 thereby assists engine 100, and allows the vehicle to run by its driving force.

In contrast, when the hybrid vehicle is under regenerative braking, MG (2) 300 is driven by the wheels through the reduction gear to act as a power generator. MG (2) 300 thereby acts as a regenerative brake that converts braking energy into electric power. The electric power generated by MG (2) 300 is stored in battery 700 and capacitor 900 through inverter (2) 600.

Battery 700 is a battery pack formed by integrating a plurality of battery cells into a battery module, and connecting a plurality of the battery modules in series. A voltage to be discharged from battery 700 and a voltage to be stored in battery 700 are regulated by converter 800. Capacitor 900 is formed of a plurality of cells connected in parallel. Alternatively, capacitor 900 may be formed such that the cells are partly connected in series to improve withstand voltage characteristic.

Engine 100, inverter (1) 500, inverter (2) 600, and converter 800 are controlled by an Electronic Control Unit (ECU) 1000. ECU 1000 includes a Hybrid Vehicle (HV)_ECU 1010, an MG_ECU 1020, and an engine ECU 1030.

A signal indicative of the temperature of capacitor 900 is input from a temperature sensor 902, and a signal indicative of the voltage of capacitor 900 is input from a voltmeter 904, to HV_ECU 1010. Furthermore, a signal indicative of the vehicle speed is input from a vehicle speed sensor 2000, and a signal indicative of the position of an accelerator pedal (not shown) is input from an accelerator pedal position sensor 2100, and a signal indicative of the leg power on a brake pedal (not shown) is input from a brake pedal leg power sensor 2200, to HV_ECU 1010.

HV_ECU 1010 is connected to a substrate 910 to which a terminal of each of the capacitor cells is grounded, and senses the voltage of each of the capacitor cells through substrate 910. Instead of using substrate 910 to sense the voltage of each of the capacitor cells, a voltmeter may be provided to each of the capacitor cells.

HV_ECU 1010 calculates electric power to be stored in each of battery 700 and capacitor 900 and electric power to be discharged from each of battery 700 and capacitor 900 based on a vehicle speed, an accelerator pedal position, a leg power on a brake pedal and others. HV_ECU 1010 also calculates a limit value WIN(B) of electric power to be stored in battery 700 (maximum value of electric power to be stored in battery 700) and a limit value WOUT(B) of electric power to be discharged from battery 700 (maximum value of electric power to be discharged from battery 700) based on, for example, the temperature and SOC of battery 700.

Similarly, HV_ECU 1010 calculates a limit value WIN(C) of electric power to be stored in capacitor 900 and a limit value WOUT(C) of electric power to be discharged from capacitor 900 based on the temperature and voltage of capacitor 900. The electric power to be stored in each of battery 700 and capacitor 900 and the electric power to be discharged from each of battery 700 and capacitor 900 are calculated such that each of the electric powers does not exceed the limit value thereof.

A signal indicative of the revolution speed of MG (1) 200 is input from a revolution speed sensor 202, and a signal indicative of the revolution speed of MG (2) 300 is input from a revolution speed sensor 302, to MG_ECU 1020. A signal indicative of the revolution speed of engine 100 is input from a revolution speed sensor 102 to engine ECU 1030.

HV_ECU 1010, MG_ECU 1020, and engine ECU 1030 are connected such that they can send and receive signals to and from each other. HV_ECU 1010 calculates, for example, output values requested for engine 100, MG (1) 200, and MG (2) 300 based on a signal input to each of the ECUs and a program and map stored in a memory (not shown).

MG_ECU 1020 controls inverter (1) 500 and inverter (2) 600 based on the output values requested for MG (1) 200 and MG (2) 300, and thereby controls MG (1) 200 and MG (2) 300. Engine ECU 1030 controls engine 100 based on the output value requested for engine 100.

In the present embodiment, charge and discharge of battery 700 and capacitor 900 are controlled by changing an output voltage of converter 800 (a system voltage).

For example, assume that electric power is to be supplied to MG (1) 200 or MG (2) 300. If an output voltage of converter 800 is made lower than the voltage of capacitor 900, capacitor 900 is discharged first. If an output voltage of converter 800 is made equal to or higher than the voltage of capacitor 900, battery 700 is discharged first.

In contrast, assume that electric power generated in MG (1) 200 or MG (2) 300 is to be stored in battery 700 or capacitor 900. If an output voltage of converter 800 is made equal to or lower than the voltage of capacitor 900, battery 700 is charged first. If an output voltage of converter 800 is made higher than the voltage of capacitor 900, capacitor 900 is charged first.

Figure 2:
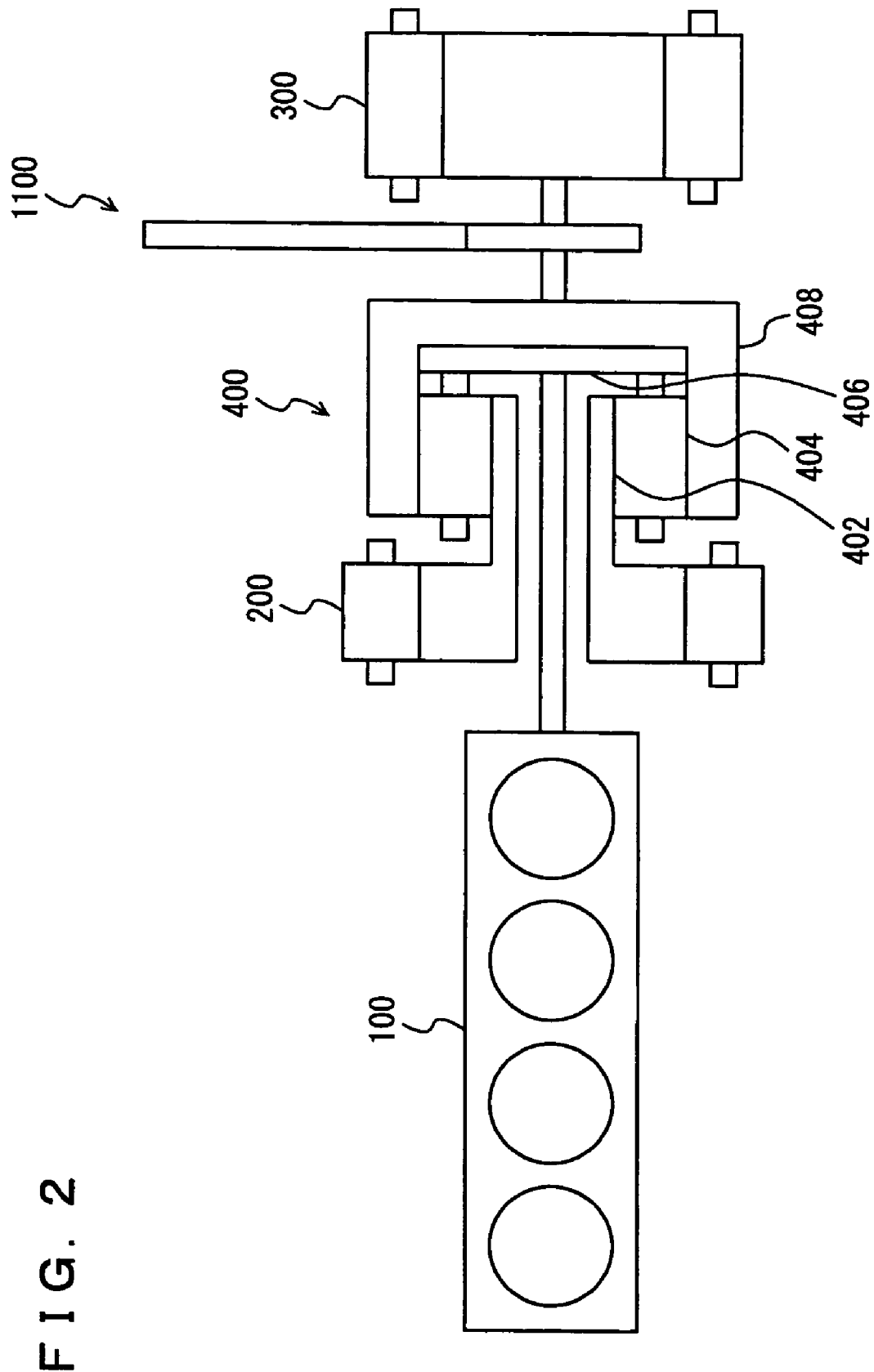
FIG. 2 is a diagram showing a power split device.

Referring to FIG. 2, power split device 400 will further be described. Power split device 400 is formed of a planetary gear including a sun gear 402, a pinion gear 404, a carrier 406, and a ring gear 408.

Pinion gear 404 engages with sun gear 402 and ring gear 408. Carrier 406 rotatably supports pinion gear 404. Sun gear 402 is coupled to a rotary shaft of MG (1) 200. Carrier 406 is coupled to a crankshaft of engine 100. Ring gear 408 is coupled to a rotary shaft of MG (2) 300 and to reduction gear 1100.

Figure 3:
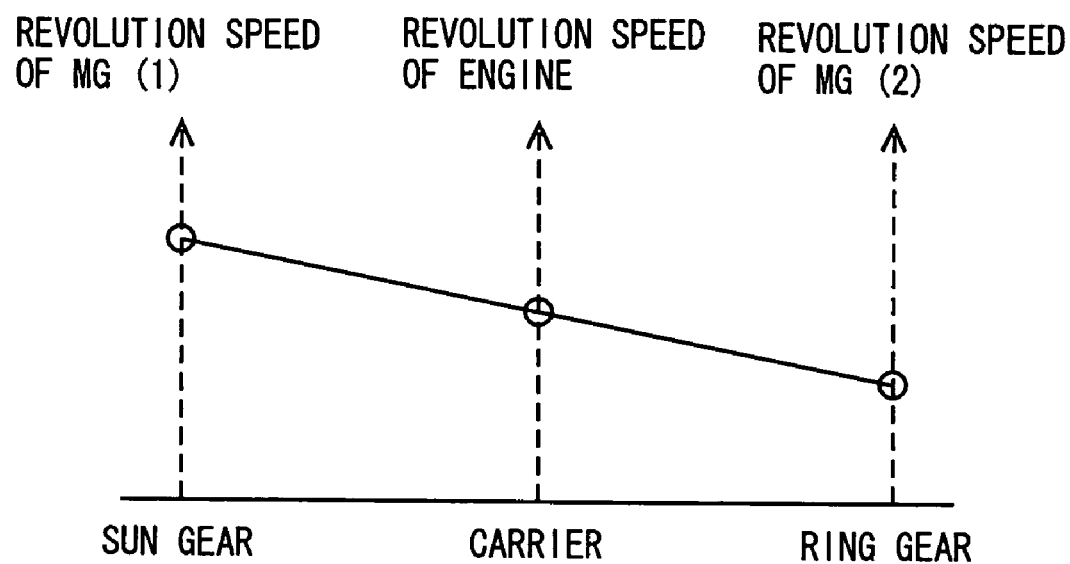
FIG. 3 is an alignment chart showing the relation of revolution speeds of an engine, an MG (1), and an MG (2).

Since engine 100, MG (1) 200, and MG (2) 300 are coupled through power split device 400 formed of the planetary gear, the revolution speeds of engine 100, MG (1) 200, and MG (2) 300 have a relation in which the revolution speeds are linearly connected with each other in an alignment chart as shown in FIG. 3.

Figure 4:
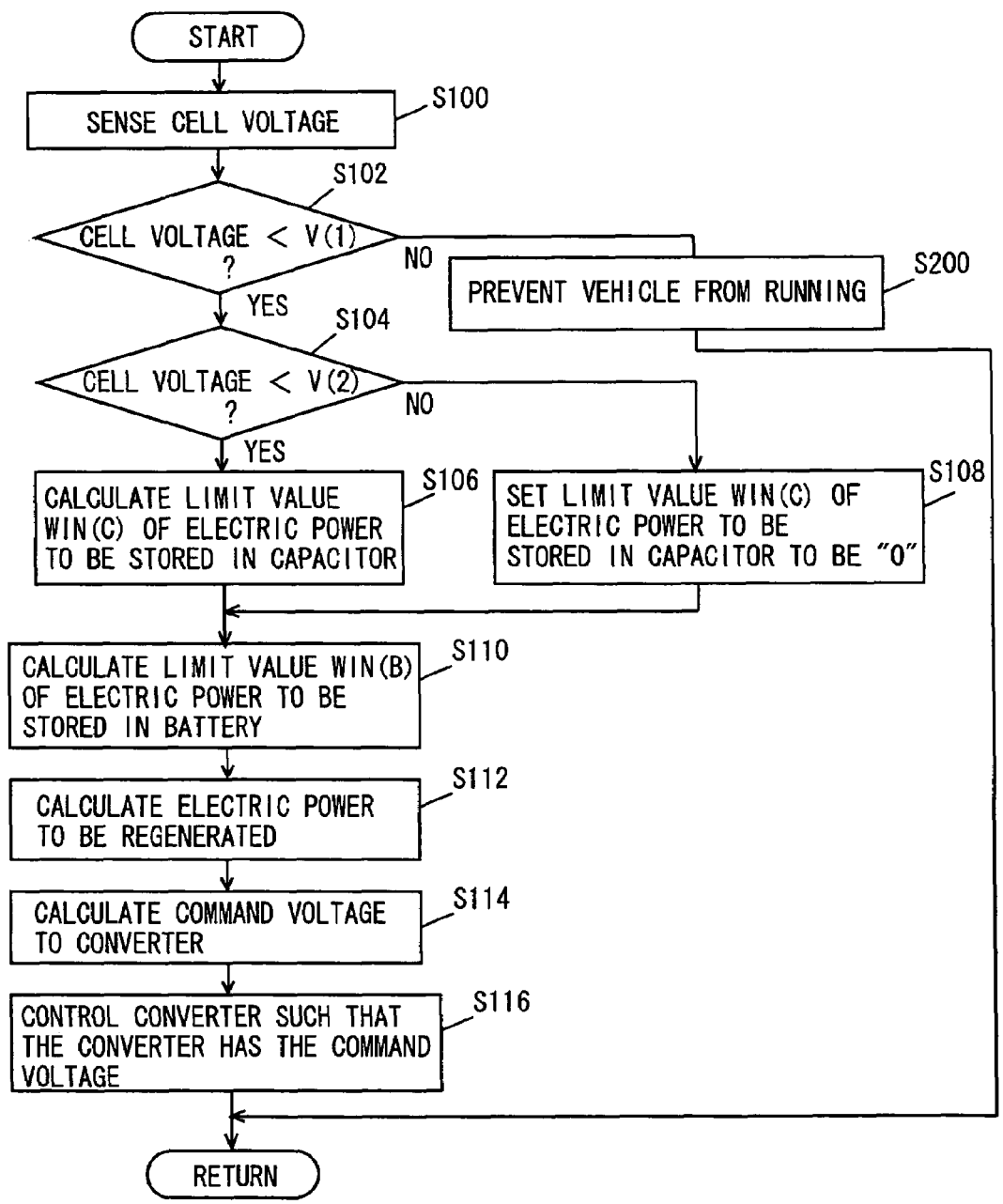
FIG. 4 is a flowchart showing a control structure of a program executed on an ECU serving as the controller according to the embodiment of the present invention.

Referring to FIG. 4, there will be described a control structure of a program executed by ECU 1000, which serves as the controller according to the present embodiment. A program described below is executed during regenerative braking of the vehicle. The program may be executed when battery 700 or capacitor 900 is charged, other than the time of regenerative braking of the vehicle.

In step (hereinafter abbreviated as S) 100, ECU 1000 senses the voltage of each of capacitor cells through substrate 910.

In S102, ECU 1000 determines whether or not each of the capacitor cells has a voltage lower than a system malfunction voltage V(1). System malfunction voltage V(1) is, for example, a rated voltage of the capacitor cells. If each of the capacitor cells has a voltage lower than system malfunction voltage V(1) (YES in S102), the process proceeds to S104. If not so (NO in S102), the process proceeds to S200.

In S104, ECU 1000 determines whether or not the each of the capacitor cells has a voltage lower than a cell charge inhibition voltage V(2). Cell charge inhibition voltage V(2) is set to take a value lower than system malfunction voltage V(1). If the each of the capacitor cells has a voltage lower than cell charge inhibition voltage V(2) (YES in S104), the process proceeds to S106. If not so (NO in S104), the process proceeds to S108.

In S106, ECU 1000 calculates limit value WIN(C) of electric power to be stored in capacitor 900. Limit value WIN(C) of electric power to be stored in capacitor 900 is calculated based on, for example, the temperature and voltage of capacitor 900.

In S108, ECU 1000 sets limit value WIN(C) of electric power to be stored in capacitor 900 to be "0". In other words, electric power to be stored in capacitor 900 is set to be "0" to stop charging capacitor 900. At this time, only the limit value WIN(C) of electric power to be stored in capacitor 900 is set to be "0", whereas limit value WOUT(C) of electric power to be discharged from capacitor 900 is not set to be "0". In other words, capacitor 900 stops being charged while it is allowed to be discharged.

In S110, ECU 1000 calculates limit value WIN(B) of electric power to be stored in battery 700. Limit value WIN(B) of electric power to be stored in battery 700 is calculated based on, for example, the temperature and SOC of battery 700. It may be possible to calculate initially limit value WIN(B) of electric power to be stored in battery 700 and then limit value WIN(C) of electric power to be stored in capacitor 900. Alternatively, it may be possible to calculate both of limit values WIN(B) and WIN(C) simultaneously.

In S112, ECU 1000 calculates electric power to be generated (electric power to be regenerated) in MG (2) 300 based on the sum of limit value WIN(C) of electric power to be stored in capacitor 900 and limit value WIN(B) of electric power to be stored in battery 700. At this time, electric power to be generated in MG (2) 300 is calculated, for example, such that the electric power does not exceed the sum of limit value WIN(C) of electric power to be stored in capacitor 900 and limit value WIN(B) of electric power to be stored in battery 700.

In S114, ECU 1000 calculates a command voltage to converter 800 (target value of output voltage of converter 800). At this time, the command voltage to converter 800 is calculated to be such a value as to allowing that the electric power to be stored in capacitor 900 does not exceed limit value WIN(C) of electric power to be stored therein and that the electric power to be stored in battery 700 does not exceed limit value WIN (B) of electric power to be stored therein.

In S116, ECU 1000 controls converter 800 such that converter 800 obtains the calculated command voltage. In S200, ECU 1000 prohibits the vehicle from running.

An operation of ECU 1000 serving as the control device according to the present embodiment will be described, the operation being based on the above-described structure and a flowchart.

If a driver performs regenerative braking by stepping on a brake pedal, for example, a voltage of each of the capacitor cells is sensed through substrate 910 (S100). At this time, assume that the voltage of each of the capacitor cells is lower than system malfunction voltage V(1) (YES in S102), and lower than cell charge inhibition voltage V(2) (YES in S104).

In this case, it can be said that electric power is required to be stored in capacitor 900 for acceleration after deceleration. Therefore, limit value WIN(C) of electric power to be stored in capacitor 900 is calculated within the bounds of not unnecessarily limiting the electric power to be stored in capacitor 900 (S106). In addition to limit value WIN(C) of electric power to be stored in capacitor 900, limit value WIN(B) of electric power to be stored in battery 700 is calculated (S110). Based on the sum of limit value WIN(C) of electric power to be stored and limit value WIN(B) of electric power to be stored, electric power to be generated in MG (2) 300 is calculated (S112).

A command voltage is calculated to allow that electric power to be generated in MG (2) 300 is stored in battery 700 and capacitor 900 such that electric power to be stored in capacitor 900 does not exceed limit value WIN(C) of electric power to be stored therein, and such that electric power to be stored in battery 700 does not exceed limit value WIN(B) of electric power to be stored therein (S114). Converter 800 is controlled such that converter 800 obtains this command voltage (S116).

Figure 5:
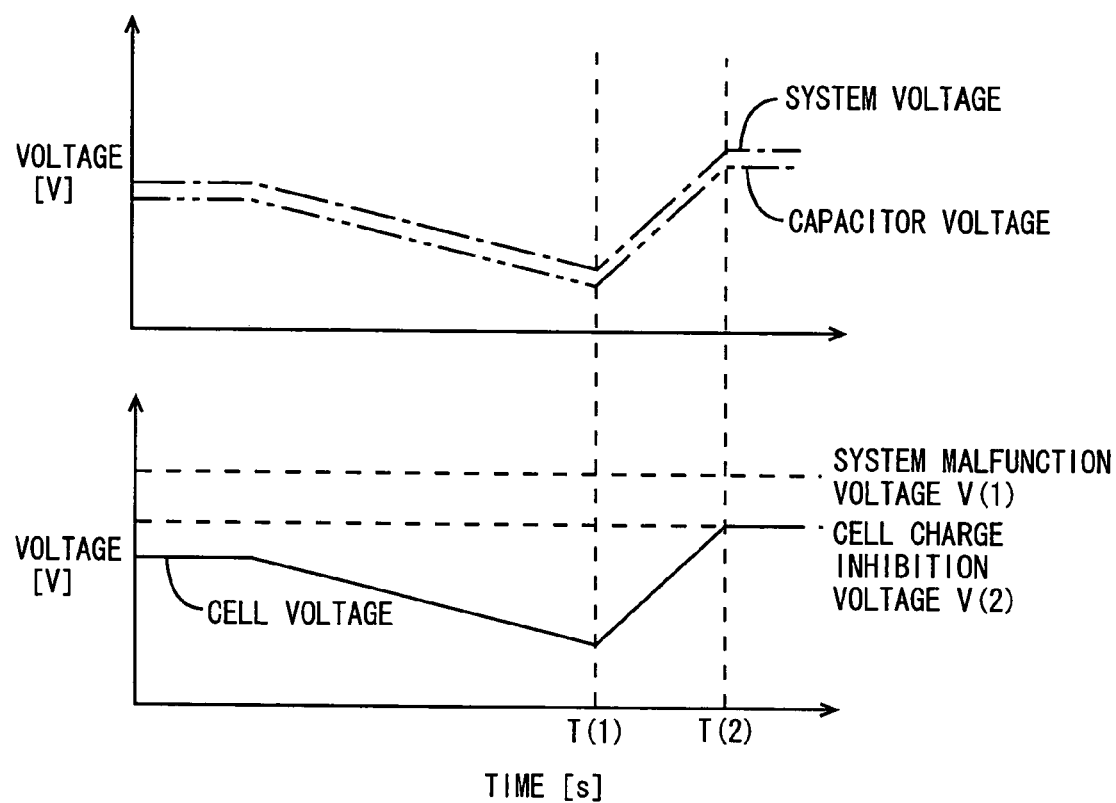
FIG. 5 is a timing chart showing a voltage transition in capacitor cells.

As shown in FIG. 5, capacitor 900 thereby starts being charged at time T(1), and the voltages of the capacitor cells start rising. It is thereby possible to recover kinetic energy as electric energy to improve energy efficiency.

If a certain malfunction occurs by charging capacitor 900 as such, and a voltage of any one of the plurality of capacitor cells is higher than system malfunction voltage V(1) (NO in S102), the vehicle is prohibited from running to prevent damage to the hybrid system (S200).

Safety of the hybrid system is assured as such. However, there may be a case where the voltages of the capacitor cells transiently exceed system malfunction voltage V(1), and hence the vehicle can frequently be prohibited from running. It is therefore necessary to start preventing voltage rise in the capacitor cells when the voltages of the capacitor cells are lower.

Accordingly, as shown by time T(2) in FIG. 5, in the case where a voltage of each of the capacitor cells is lower than system malfunction voltage V(1) (YES in S102), if a voltage of any one of the capacitor cells is higher than cell charge inhibition voltage V(2) lower than system malfunction voltage V(1) (NO in S104), limit value WIN(C) of electric power to be stored in capacitor 900 is set to be "0" (S108).

By setting limit value WIN(C) of electric power to be stored in capacitor 900 to be "0", a command voltage of converter 800 (system voltage) is kept constant, and electric power to be stored in capacitor 900 is set to be "0" to stop charging capacitor 900.

By doing so, the voltages of the capacitor cells are prevented from exceeding cell charge inhibition voltage V(2). Therefore, even if the voltages of the capacitor cells transiently exceed cell charge inhibition voltage V(2) because of an operational delay in converter 800 and the like, the voltages of the capacitor cells can be prevented from exceeding system malfunction voltage V(1). As a result, it is possible to prevent the vehicle from being frequently prohibited from running.

Furthermore, capacitor 900 is allowed to be discharged at this time, and hence it is possible to consume electric power, which is stored in capacitor 900, during reacceleration after regenerative braking to lower the voltages of the capacitor cells. It is thereby possible to promote lowering of the voltages of the capacitor cells to a voltage lower than cell charge inhibition voltage V(2).

As described above, according to the ECU 1000, which serves as the control device according to the present embodiment, if the voltages of the capacitor cells are higher than cell charge inhibition voltage V(2) lower than system malfunction voltage V(1), limit value WIN(C) of electric power to be stored in capacitor 900 is set to be "0", and capacitor 900 stops being charged. It is thereby possible to prevent the voltages of the capacitor cells from exceeding cell charge inhibition voltage V(2). Therefore, even if the voltages of the capacitor cells transiently exceed cell charge inhibition voltage V(2) because of an operational delay in the converter and the like, it is possible to prevent the voltages of the capacitor cells from exceeding system malfunction voltage V(1). As a result, it is possible to prevent the hybrid system from being brought into a malfunctional state.

If capacitor 900 stops being charged, electric power generated in MG (2) 300 may be stored in battery 700, or may be consumed as heat by MG (1) 200 driving engine 100.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A controller for a drive system including a battery, a capacitor connected in parallel with said battery, and a rotating electrical machine generating electric power to be stored in said battery and said capacitor during regenerative braking of a vehicle, the controller for the drive system comprising:
   a first calculation portion calculating a first maximum value of electric power to be stored in said battery;
   a second calculation portion calculating a second maximum value of electric power to be stored in said capacitor such that a voltage of said capacitor is not more than a second voltage lower than a predetermined first voltage;
   a third calculation portion calculating electric power to be generated in said rotating electrical machine based on said first maximum value and said second maximum value; and
   a control portion controlling charge of said battery and said capacitor based on said first maximum value and said second maximum value.

2. The controller for the drive system according to claim 1 wherein
   said second calculation portion calculates said second maximum value to be zero when the voltage of said capacitor reaches said second voltage, and said capacitor is allowed to be discharged when the voltage of said capacitor reaches said second voltage.

3. The controller for the drive system according to claim 1, wherein said first voltage is such that said drive system is determined to be malfunctional when the voltage of said capacitor reaches said first voltage.

4. The controller for the drive system according to claim 3 wherein said second calculation portion calculates said second maximum value to be zero when the voltage of said capacitor reaches said second voltage, and said capacitor is allowed to be discharged when the voltage of said capacitor reaches said second voltage.

5. A controller for a drive system including a battery, a capacitor connected in parallel with said battery, and a rotating electrical machine generating electric power to be stored in said battery and said capacitor during regenerative braking of a vehicle, the controller for the drive system comprising:

first calculation means for calculating a first maximum value of electric power to be stored in said battery;

second calculation means for calculating a second maximum value of electric power to be stored in said capacitor such that a voltage of said capacitor is not more than a second voltage lower than a predetermined first voltage;

third calculation means for calculating electric power to be generated in said rotating electrical machine based on said first maximum value and said second maximum value; and control means for controlling charge of said battery and said capacitor based on said first maximum value and said second maximum value.

6. The controller for the drive system according to claim 5 wherein said second calculation means includes means for calculating said second maximum value to be zero when the voltage of said capacitor reaches said second voltage, and said capacitor is allowed to be discharged when the voltage of said capacitor reaches said second voltage.

7. The controller for the drive system according to claim 5, wherein said first voltage is such that said drive system is determined to be malfunctional when the voltage of said capacitor reaches said first voltage.

8. The controller for the drive system according to claim 7 wherein said second calculation means includes means for calculating said second maximum value to be zero when the voltage of said capacitor reaches said second voltage, and said capacitor is allowed to be discharged when the voltage of said capacitor reaches said second voltage.

* * * * *